United States Patent
Eves et al.

(10) Patent No.: US 8,271,945 B2
(45) Date of Patent: Sep. 18, 2012

(54) ASSETS AND EFFECTS

(75) Inventors: David A. Eves, Crawley (GB); Richard S. Cole, Redhill (GB)

(73) Assignee: AMBX UK Limited, Surrey (GB)

( * ) Notice: Subject to any disclaimer, the term of this patent is extended or adjusted under 35 U.S.C. 154(b) by 1529 days.

(21) Appl. No.: 10/596,326

(22) PCT Filed: Dec. 10, 2004

(86) PCT No.: PCT/IB2004/052751
§ 371 (c)(1),
(2), (4) Date: Jun. 9, 2006

(87) PCT Pub. No.: WO2005/058442
PCT Pub. Date: Jun. 30, 2005

(65) Prior Publication Data
US 2008/0295072 A1 Nov. 27, 2008

(30) Foreign Application Priority Data
Dec. 12, 2003 (GB) .................................. 0328953.5

(51) Int. Cl.
*G06F 9/44* (2006.01)
(52) U.S. Cl. ........................................ 717/115; 717/110
(58) Field of Classification Search .................. 717/114, 717/110, 115
See application file for complete search history.

(56) References Cited

U.S. PATENT DOCUMENTS

2002/0169012 A1* 11/2002 Eves et al. .......................... 463/1
2002/0169817 A1* 11/2002 Eves et al. ..................... 709/201

* cited by examiner

*Primary Examiner* — Anna Deng
(74) *Attorney, Agent, or Firm* — Burns & Levinson LLP; Bruce D. Jobse, Esq.

(57) ABSTRACT

A method of operating a set of devices comprises receiving a real-world description in the form of an instruction set of a markup language, the description including asset terms and effect terms, requesting assets and effects according to the description, modifying at least one asset according to at least one effect, and operating the devices according to the assets.

15 Claims, 6 Drawing Sheets

```
<pml>
<fragment> example

<asset> asset1
                <state> sunny </state>                  ← 206
                <type> rgb_light </type>
                <value> 100,100,0 </value>
        </asset>

<asset> asset2
                <state> sunny </state>                  ← 208
                <type> audio_mp3 </type>
                <value> birdsong.mp3 </value>
        </asset>

<effect> effect1
                <state> shake </state>                  ← 210
                <type> all </type>
                <value> shaking </value>
        </effect>

<object> object1
                <state> sunny </state>                  ← 200
                <location> everywhere </location>
        </object>

<object> object2
                <state> shake </state>                  ← 202
                <location> N, NE, NW </location>
        </object>                       \
                                         204
</fragment>
</pml>
```

FIG.6

ASSETS AND EFFECTS

This invention relates to a method of operating a set of devices and to a system comprising a set of devices. In particular it relates to a method and system that involve the receipt of a real-world description in the form of an instruction set of a markup language.

United States patent application publication US 2002/0169817 discloses a real-world representation system that comprises a set of devices, each device being arranged to provide one or more real-world parameters, for example audio and visual characteristics. At least one of the devices is arranged to receive a real-world description in the form of an instruction set of a markup language and the devices are operated according to the description. General terms expressed in the language are interpreted by either a local server or a distributed browser to operate the devices to render the real-world experience to the user.

United States patent application publication US 2002/0169012 discloses a method of operating a set of devices that comprises receiving a signal, for example at least part of a game world model from a computer program. The signal is analysed to produce a real-world description in the form of an instruction set of a markup language and the set of devices is operated according to the description.

The prior art systems allow specific terms to be authored or generated that can be passed to a set of devices for interpreting and rendering. It is an object of the invention to improve upon the known systems and methods.

According to a first aspect of the present invention, there is provided a method of operating a set of devices comprising receiving a real-world description in the form of an instruction set of a markup language, the description including asset terms and effect terms, requesting assets and effects according to the terms in the description, modifying at least one asset according to at least one effect, and operating the devices according to the assets.

According to a second aspect of the present invention, there is provided a system comprising a set of devices, at least one device of the system being arranged to receive a real-world description in the form of an instruction set of a markup language, the description including asset terms and effect terms, to request assets and effects according to the terms in the description, and to modify at least one asset according to at least one effect, the devices of the set being operated according to the assets.

Owing to the invention, it is possible to provide a system that includes a second independent layer of description effects. This is an extension to a description language (such as Physical Markup Language (PML), which is described in the prior art documents referred to above), which rather than just using the description of assets to be rendered in a location to define the behaviour of the experience also includes a second independent layer of description effects. These effects act as modifiers upon the assets to which they are applied, which modifying may or may not be defined by location. The effects are not in any way constrained to the same scope or type as the assets they modify, so for example a "fade out" effect applied to an area could fade both audio and lighting levels to zero.

In an embodiment of the method, the modifying of an asset can be executed by a first device of the set of devices, with the first device transmitting the modified asset to a second device in the set. In addition, or alternatively, a device of the set of devices receives an unmodified asset, the modifying of the asset being executed by that device.

Advantageously, the method further comprises receiving, as a portion of the real-world description, location data, the location data being associated with at least one term of the real-world description. One or more of the terms of the real-world description can be location neutral. The method further comprises retrieving location information for at least some of the devices in the set of devices, matching the location information with the location data, and modifying only some of the assets according to the matching. By including location as a parameter in the modifying process, a broader range of experiences is possible, for a given set of assets.

Preferably, the modifying of at least one asset comprises modifying an asset according to a plurality of effects. It is therefore possible to combine effects in the modifying of an asset, the effects being applied sequentially or simultaneously to the asset, again to produce a broader range of possibilities for rendering experiences.

In the system of the invention, advantageously, at least some of the devices of the set are interconnected by a wireless network. It is also possible that at least some of the devices of the set are interconnected by a powerline carrier network. Preferably, a device of the set is a local server. One or more devices of the set of devices may be provided with storage capability, which capability is accessible by at least one other device of the set. Preferably, each device of the set of devices has associated location information.

Embodiments of the invention will now be described, by way of example only, with reference to the accompanying drawings, in which.

Figure 1:
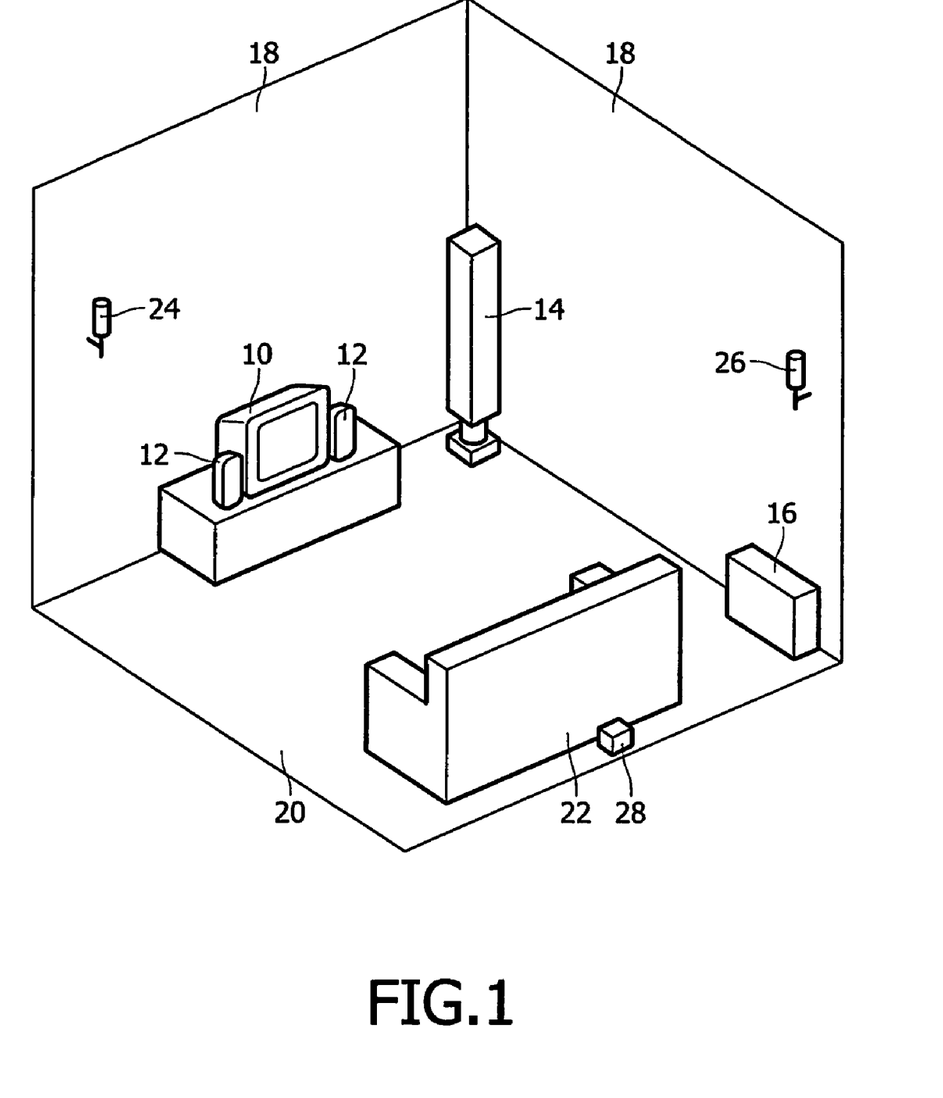
FIG. 1 is a schematic perspective view of a real-world representation system, the system comprising a set of devices.
Figure 2:
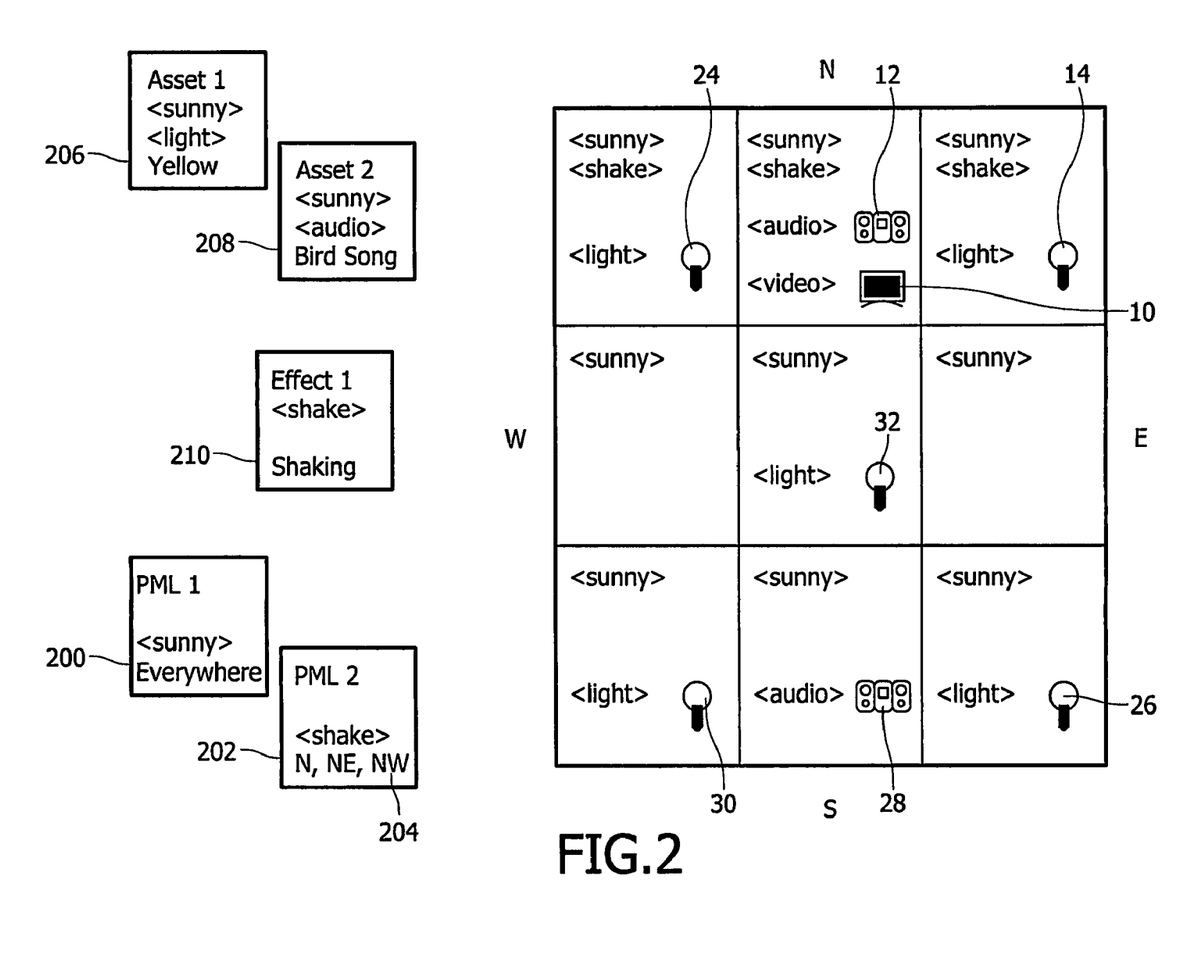
FIG. 2 is a schematic diagram of the set of devices of FIG. 1, showing markup language description, assets and effects for use in operating the devices.

In FIG. 1 the real-world representation system comprises a set of devices including a display device 10, audio speakers 12 and 28, lighting devices 14, 24 and 26, a heating device 16, walls 18 and the floor 20. These devices together contribute to make up the ambient environment, each device being arranged to provide one or more real-world parameters. For example, the lighting device 14 contributes colour tones as well as to the luminance level. The devices may be electronic or they may be purely mechanical. A wireless network interconnects the devices. Equally a wired network, such as a powerline carrier network, could be used to interconnect the devices of the set. Lighting device 30 is also present in the set in the opposite corner to the device 14, but is shown in FIG. 2, but omitted from FIG. 1 on the grounds of clarity. The room is also provided with a centred ceiling light 32, again omitted from FIG. 1 on clarity grounds.

In addition to the display device 10, the walls 18 and floor 20 are also provided with display functionality. This can be achieved either by the walls 18 and floor 20 being composed of fabric display material, or a suitably located ceiling projector can illuminate the visible portions of the walls 18 and the floor 20. It is also possible to back light the walls 18 if the environment allows for it. The ceiling can also be provided with display functionality.

The system of FIG. 1 is shown as being a room with a couch 22 for a user, the room being part of a private dwelling.

However the room could be, for example, a hotel room or part of an entertainment complex or could form part of a public space.

When the set of devices are operated to provide an ambient environment, at least one of the devices making up the real-world representation system is arranged to receive a real-world description in the form of an instruction set of a markup language, the devices being operated according to the description.

In a simple embodiment, this description would form part of a broadcast signal, for example as augmentation of a film that a user is watching. The description need not be carried with the film, it could, for example, be recalled from a local or remote store. Alternatively, the description could relate to an activity that a user is undertaking or could be triggered from a user interface or could trigger automatically from some predefined event, for example, a user entering a room.

Figure 3:
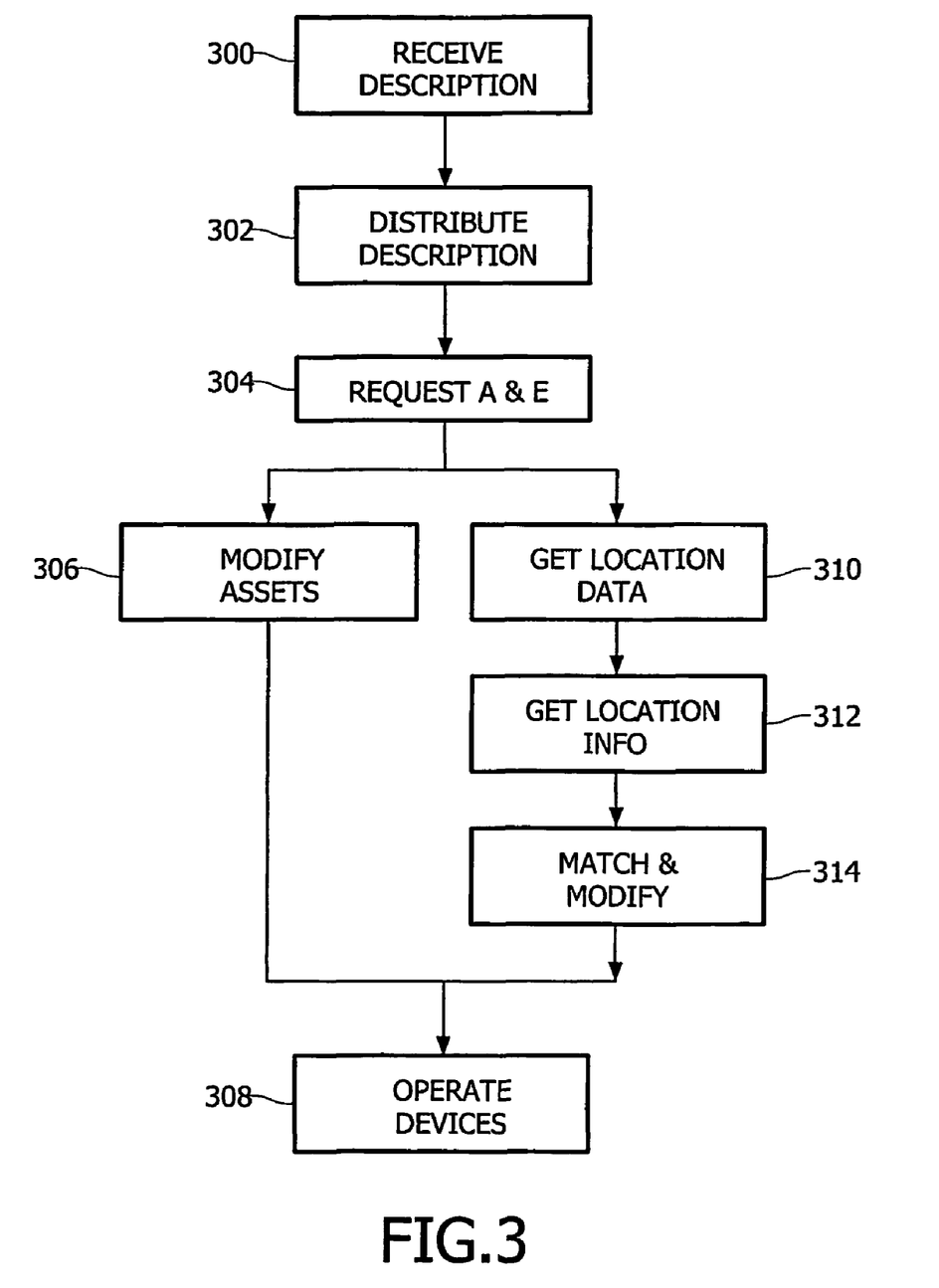
FIGS. 3 and 4 are flow diagrams of methods of operating the set of devices.
Figure 6:
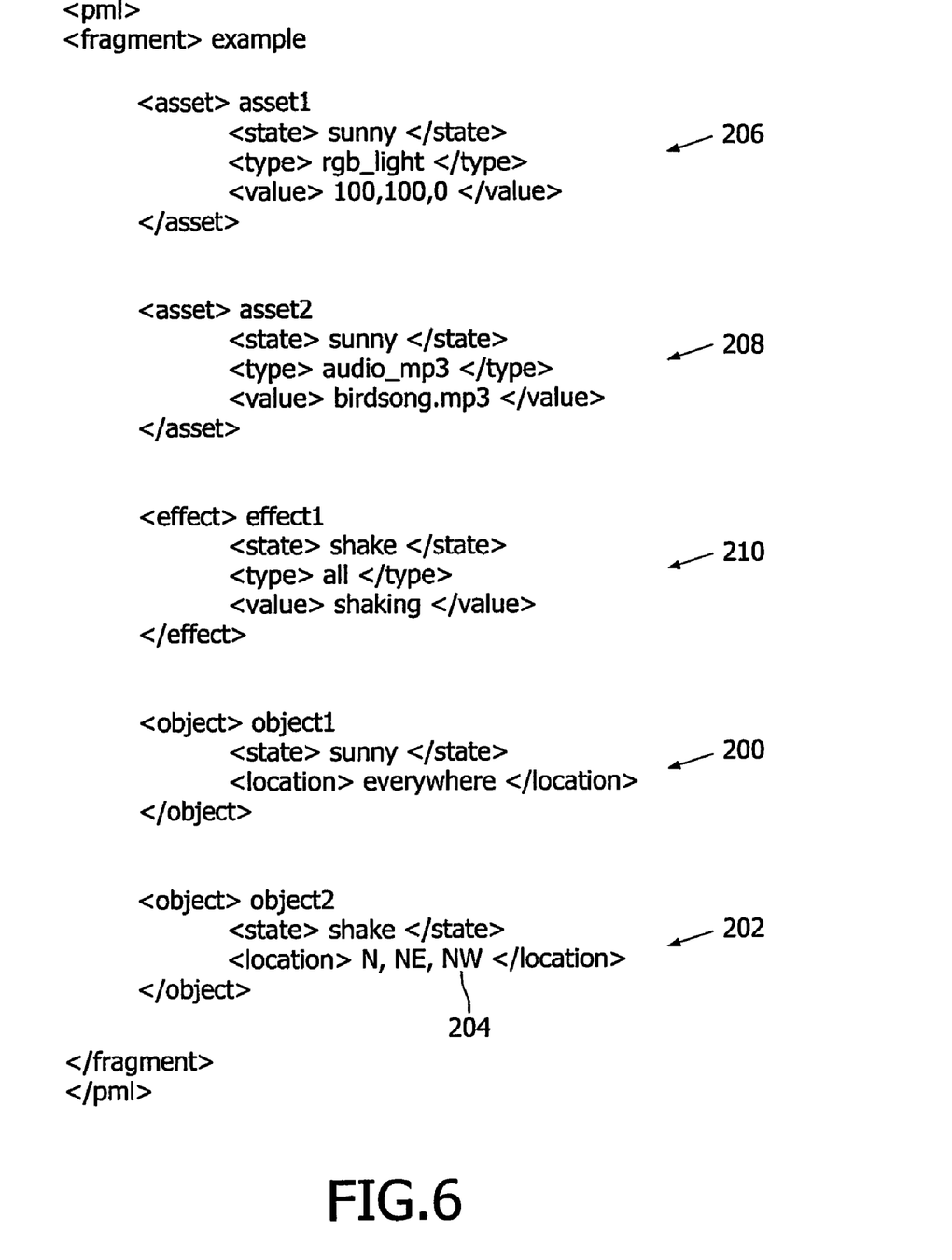
FIG. 6 is a section of XML code comprising a real-world description.

A first embodiment of a method of operating the set of devices is shown in the flowchart of FIG. 3. The first step 300 comprises receiving a real-world description in the form of an instruction set of a markup language. An example of such an instruction set is illustrated in FIG. 6. The description includes asset term 201 <SUNNY> and effect term 202 <SHAKE>. A portion of the real-world description is also location data 204, the location data 204 being associated with at least one term of the real-world description, in this case the term 202, being the effect term <SHAKE>.

It should be noted that the use of <SUNNY> in this specification and some of the drawings is a shorthand version of the XML standard structure <tag> value <\tag>, and is used for purposes of clarity.

The second step 302 comprises distributing this description amongst the devices of the set. This is followed by the step 304, which comprises requesting assets and effects according to the terms of the real-world description. In the diagram of FIG. 2, two separate assets 206 and 208 are shown corresponding to the term <SUNNY> and on effect 210 is shown, which corresponds to the effect <SHAKE>. The assets and effects can be delivered with the description, or they can be stored locally, or even within a particular device. The assets and effects can be fairly basic information such as RGB colour values or more complicated structures such as MP3 files, video files or http addresses pointing to further resources. In essence, when a device receives a term of the markup language, it makes a request for the appropriate asset and/or effect.

Following the step 304, the set of devices will either go through the step 306 of modifying at least one asset according to at least one effect, or will go through the steps 310, 312 an 314, the latter case being discussed in more detail below. In the former case, the effects modify the assets. For example, the effect 210 <SHAKE> will modify the asset 206 <SUNNY> by introducing an oscillation into the lighting level contained within the asset 206, thereby creating a shaking like effect when that asset is rendered, by whichever device or devices render the asset. The effect 210 contains within it instructions on how to amend each possible characteristic of the ambient environment such as lighting, sound etc. This need not be complicated, and can be limited to only some of the features of the environment as desired by the original author of the effect.

Following the step 306, is the step 308 of operating the devices in the set according to the assets (whether modified by the effects or not). Each markup language enabled device operates in principally the same manner. For example, the lighting device 14 has receiving means for receiving the real-world description in the form of an instruction set of a markup language, the receiving means including part of a distributed browser that interprets the instructions of the instruction set. The portion of the browser in the receiving means communicates with adjusting means that is arranged to adjust one or more parameters of the lighting device 14.

In this example, the real-world description reads <SUNNY>, and the browser part in the receiving means 24 interprets this into specific instructions relating to the colour tones and luminance level for the adjusting means 26 to adjust their levels accordingly. In this example the likely colour tone would be a pleasant yellow/orange and the light level would be warm and bright. The browser part interprets instructions of a general type to generate specific parameter adjustments.

The description is received by all of the other parts of the distributed browser in each of the other devices in the real-world representation system. Each device interprets the instructions and adjusts its parameter configuration accordingly. The more enabled devices that are present in a particular environment the more realistic the end result will be. In particular the operability of the walls 18 and floor 20 as display devices will determine how immersed in the real-world representation the user feels.

As mentioned above, following the step 304 of requesting the assets and effects, a more complicated possibility for handling the assets and effects is contained in the branch comprising steps 310, 312 and 314. In step 310, location data 204 is received as a portion of the real-world description, the location data being associated with the term 202 of the real-world description. The term 200 of the real-world description is location neutral. The location data 204 specifies the spatial domain in which the asset or effect is to be applied. In this example the location data 204 is associated with the effect term 202 <SHAKE> and consists of the data "N, NE, NW". This means that the effect term 202 will only be applied to assets being rendered in the spatial domain corresponding to this data. In FIG. 2, the devices h this domain are the lighting devices 24 and 14, the audio device 12 and the display device 10.

Once the location data has been received (effectively extracted from the description) the step 312 of retrieving location information for at least some of the devices in the set of devices is carried out. Each device, if it has the functionality, can store its logical location on some local storage medium. For example, the display device 10 is sufficiently sophisticated to have internal memory that can be written to and so includes the location information "N". This data can be entered by a user or can be generated during a system set-up, either manually or automatically. If a device, for example the lighting device 24, does not have any storage functionality then its location information can be stored on another device or on a central server. This location information can be retrieved, because all of the devices in the room are interconnected.

The next step in the method of operating the devices is the step 314 of matching the location information (which is the location of the devices) with the location data (which is spatial areas in which effects are to be applied). As will be appreciated, this is a fairly straightforward process involving a comparison of the two data sets and resolving accordingly. As in the more simplified operation of the modification discussed above, once the matching has occurred, the appropriate assets are modified with the effects that apply in the relevant space.

Following the step 314 of matching and modifying the assets accordingly, the step 308 of operating the devices according to the assets is carried out. So for example, the lighting device 14 will render the asset <SUNNY> 206 modified by the effect <SHAKE> 210 as it is in the location NE, which is covered in the location data 204. However, the similar lighting device 30 renders the original asset <SUNNY> 206 in an unmodified form, as it is in the location SW, which is not covered in the location data 204.

Figure 4:
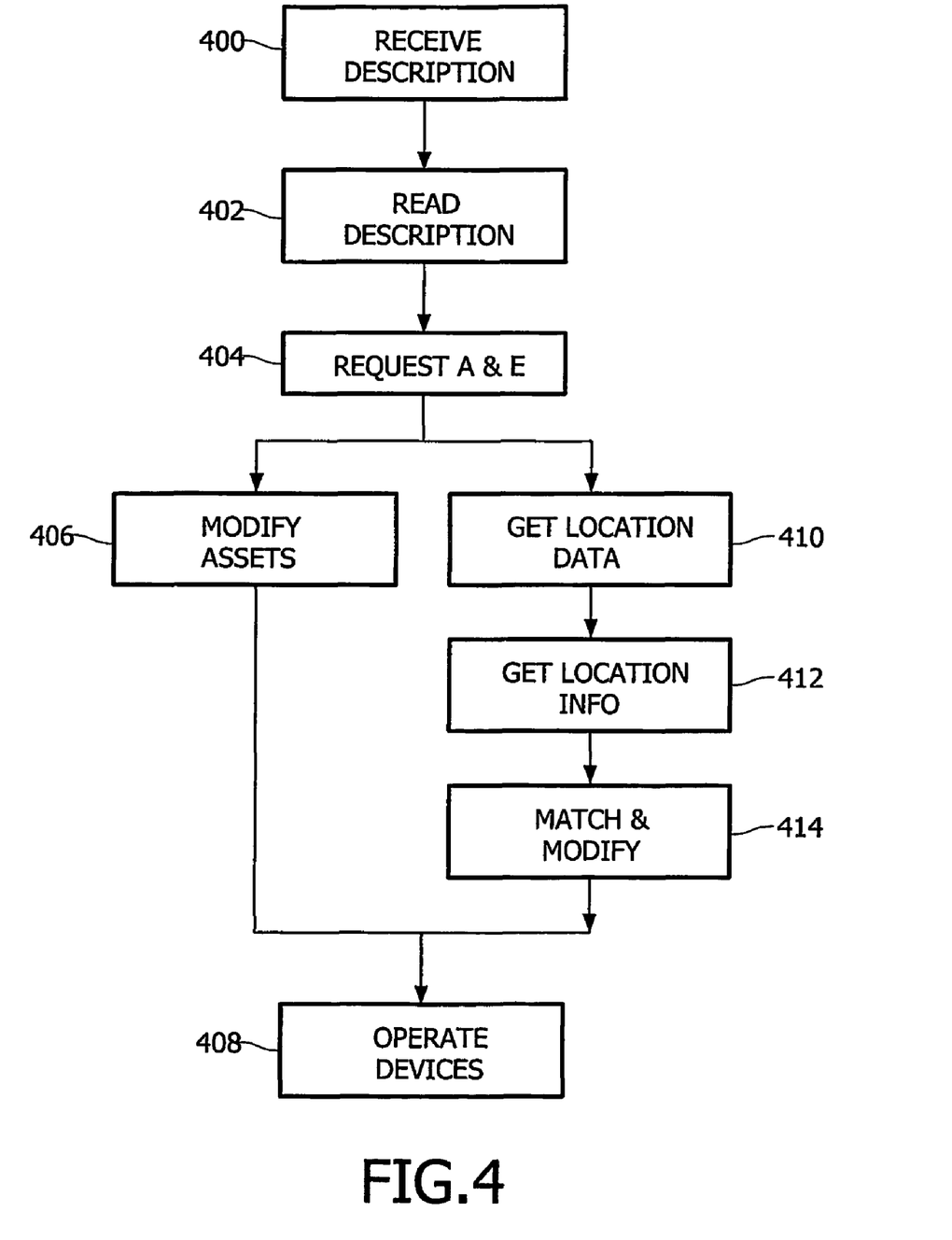

A second embodiment of the method of operating the set of devices is outlined in the flowchart of FIG. 4. This method differs from the method of FIG. 3 only in the handling of the real-world description after it has been received by one of the devices in the set of devices. Therefore step 402 effectively replaces step 302 in this flowchart, all other steps including steps 400, 404, 406, 408, 410, 412, and 414 are identical to steps 300, 304, 306, 308, 310, 312, and 314, respectively. In step 402 the description is read at a local server, which can be a dedicated device or could be contained within the capability of a device that nominally has a different purpose. The description is not distributed amongst the devices.

In this embodiment a browser or operating system present on the local server interprets the instructions of the real-world description and generates specific parameter adjustments for communicating to the relevant device. In this way devices currently available can be used without the requirement that they be modified or purpose built for use in the real-world representation system. The local server executes all of the steps in the method, which could be a PC or home entertainment centre, except for the final step 408 of operating the devices.

In either the embodiment of FIG. 3 or FIG. 4, the actual location of the modification of any asset is independent of whether a particular device receives the real-world description or not. So a first device of the set of devices may execute the modification of an asset, the first device then transmitting the modified asset to a second device. In the embodiment of FIG. 3, for example, where the description is distributed amongst all the devices of the set, a low capability device such as the lighting device 24, even though it receives the asset 206 <SUNNY> and the effect 210 <SHAKE>, the actual modification of the asset 206 by the effect 210 may need to be executed on a device that has sufficient processing power, the modified asset being returned to the lighting device 24 in due course for rendering. Likewise in the embodiment of FIG. 4, the central server will execute the modification of the asset before passing specific instructions to the legacy devices in the system.

It is also possible that the modifying of an asset comprises modifying the asset according to a plurality of assets. This occurs when a number of effect terms are present within the real-world description received by the set of devices, and there is some overlap in the location data associated with the effect terms. In this case some or all of the assets will be acted upon by a plurality of effects. This modification of the assets can be cumulative or effects can be applied sequentially according to the original authoring of the effects.

Figure 5:
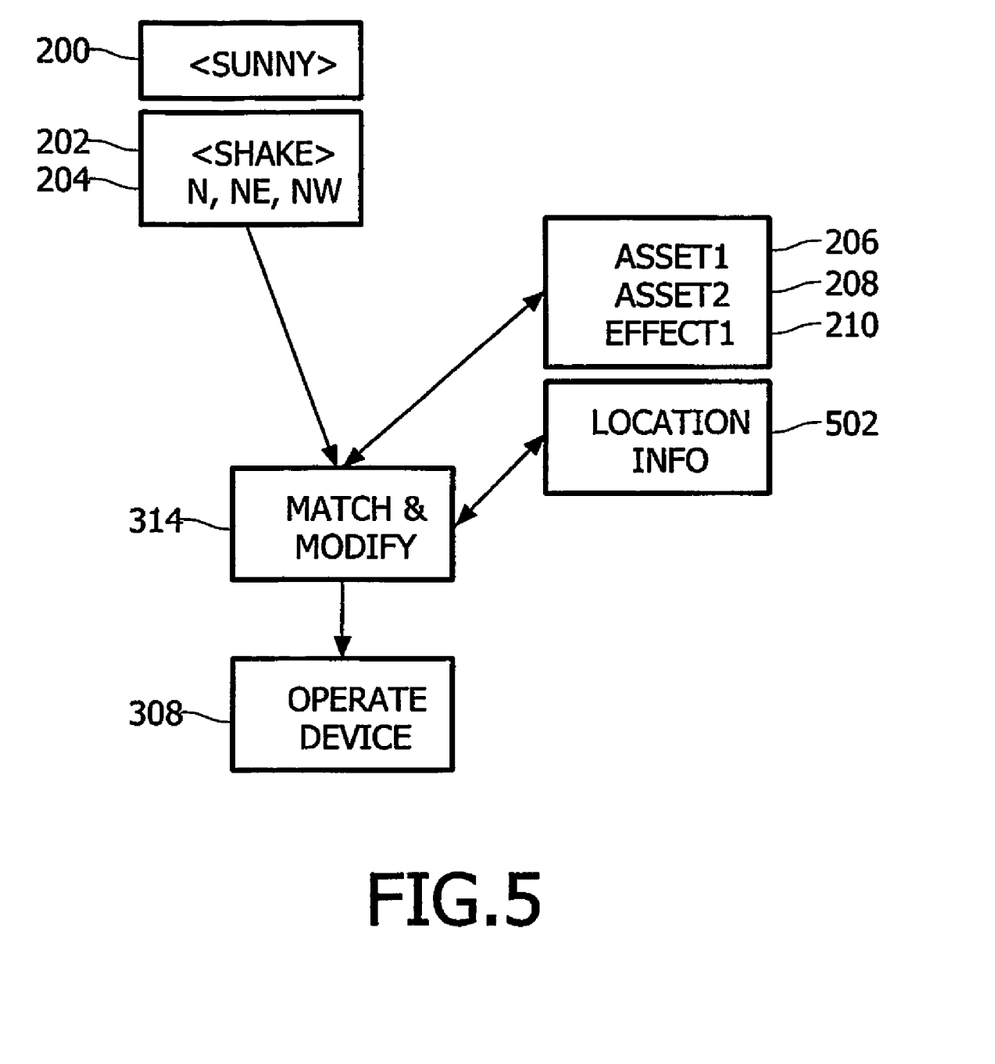
FIG. 5 is a schematic diagram showing the interaction between the description, assets and effects and the location data and information.

FIG. 5 shows a schematic diagram illustrating the interaction between the real-world description, assets and effects and the location data and information. The description is made up of the asset term 200 <SUNNY> and the effect term 202 <SHAKE>, which also has corresponding location data "N, NE, NW" associated with it. This description is distributed to the devices in the set, which each execute matching of location data 204 with the location information 502 and appropriate modification of the assets 206 and 208 by the effect 210. This step is summarised by the box 314 and the rendering is summarised by the box 308. The assets 206 and 208 and effect 210 and the location information 502 can be stored on the individual device that is rendering the modified asset, or may be stored elsewhere and requested by the device on demand.

An example of a section of XML code comprising a real-world description is shown in FIG. 6. This is the real-world description in the form of an instruction set of a markup language that is received by the system comprising the set of devices shown in FIGS. 1 and 2. As discussed above a typical example of the operation of the system is to augment a film or television broadcast, but many other situations are possible. This fragment of description includes the basic asset term 200 <SUNNY> and effect term 202 <SHAKE>, but also includes the assets 206 and 208 and the effect 210. In the case of the asset 206 <SUNNY> the actual RGB colour value to be rendered is included in the asset, whereas the asset 208 <SUNNY> contains the filename "birdsong.mp3", which any device rendering the asset will need to acquire, if does not have the asset stored locally.

The inclusion of the description in a broadcast signal allows the user to be immersed in an environment that is linked to a broadcast that he is receiving, for example a broadcast television signal. I.e. if the user is watching a film, then as the film moves through various scenes in turn these can be rendered by the set of devices making up the real-world representation system. If an underwater scene is showing on the television then the broadcast could include a description <WATER>, <COLD> and this will be interpreted by the relevant parts of the system to render the real-world experience to the user, turning the lights blue etc. This description can be received at all locations where there is a real-world representation system operating and each individual system will render the experience to the best of the functionality of the devices in the system.

The description can also relate directly to an activity that a user is undertaking, for example, reading a book. The individual pages of the book can trigger different descriptions being passed to the real-world representation system. Each description is linked by content to the particular theme or scene of the book at the respective point in the book. For example, the children's story "Little Red Riding Hood" has a number of discrete scenes within it, including a forest and the interior of a cottage, each of which can be rendered by the devices of the system in turn depending upon the place in the story that the reader has reached. A movement sensor may be employed to detect the turning of the pages, or the book may have inbuilt functionality that automatically detects which page the reader is looking at and triggers the appropriate description that is then rendered by the system. The triggering is ideally carried out via a wireless connection.

A user can also operate the system in a relatively simple manner from a user interface such as a remote control, although equally an enabled PDA or other mobile terminal could be employed. The user can select an environment that they wish to be immersed in from preselected total descriptions or create a new environment from pre- or user defined variables. Such a total description may, for example, be <CHINESE RESTAURANT>, which real-world experience is then rendered by the devices in the system. The real-worlds generated can be fantasy environments or they can be realistic.

The user can also operate the user interface to set limits on the operation of the devices in the system. For example, if the user wishes to set the volume of those devices with an audio capability to a specific range or set an upper limit on the volume then they can do so via the user interface. This prevents experiences becoming unpleasant for the user. The level of the light and the rate of any change in light intensity are also things that the user can control. All of the parameters of the system can be user defined.

The description of the real-world experiences is provided by a markup language that communicates a description of physical environments and the objects within them, their relationship to the user, each other and to the physical space. Within a location that is enabled to produce a real-world experience, the instruction set of the markup language is interpreted by a device or devices to render the experience. Each device that is enabled contains a component that interprets the instruction set to the best of its capability.

The language contains a wide range of states that can be rendered by the devices in a real-world representation system. Such states relate to:

Image display—specific images, streamed video
Audio—music, sound effects, voice
Mood—emotional, ambient, animated
Light—levels (relative/absolute), moods, colours, position, focus
User display and input—feedback, menu display
Time—time of day, season
Location—absolute, fantasy, generic type.

Any information that relates to a physical experience can be expressed in this markup language as long as the browser or local server is arranged to interpret the description. To create instruction sets in the markup language an author can write directly into the language or a computer program for authoring an instruction set can be used. The authoring program can take data input in the form of, for example, text or video and can generate a set of instructions comprising a subset of the markup language that when passed to a real-world representation system will allow the devices in that system to render the experience that corresponds to that of the text or video.

The language is XML compliant, XML being a meta-language that describes the standard structure for new markup languages.

The invention claimed is:

1. A method of operating a set of devices comprising:
   receiving a real-world description in the form of an instruction set of a markup language, the real-world description including asset terms and effect terms,
   requesting assets associated with the asset terms and effects associated with the effect terms in the real-world description,
   modifying at least one asset associated with an asset term in the real-world description according to at least one effect associated with an effect term in the real-world description, and
   operating the devices according to the at least one modified asset.

2. A method according to claim 1, wherein the modifying of an asset is executed by a first device of the set of devices, the first device transmitting the modified asset to a second device in a set.

3. A method according to claim 1, wherein a device of the set of devices receives an unmodified asset, the modifying of the asset being executed by that device.

4. A method according to claim 1, and further comprising:
   receiving, as a portion of the real-world description, location data, the location data being associated with at least one term of the real-world description.

5. A method according to claim 1, wherein at least one of the terms of the real-world description is location neutral.

6. A method according to claim 4, and further comprising retrieving location information for at least some of the devices in the set of devices, matching the location information with the location data, and modifying only some of the assets according to the matching.

7. A method according to claim 1, and further comprising distributing the real-world description amongst the devices of the set.

8. A method according to claim 1, and further comprising reading the real-world description at a local server.

9. A method according to claim 1, wherein the modifying of at least one asset comprising modifying an asset according to a plurality of effects.

10. A system comprising:
    a set of devices, at least one device of the system being arranged:
    to receive a real-world description in the form of an instruction set of a markup language, the real-world description including asset terms and effect terms,
    to request assets associated with the asset terms and effects associated with the effect terms according to the terms in the real-world description, and
    to modify at least one asset associated with an asset term in the real-world description according to at least one effect identified by associated with an effect term in the real-world description, the devices of the set being operated according to the at least one modified asset.

11. A system according to claim 10, wherein at least some of the devices of the set are interconnected by a wireless network.

12. A system according to claim 10, wherein at least some of the devices of the set are interconnected by a powerline carrier network.

13. A system according to claim 10, wherein a device of the set is a local server.

14. A system according to claim 10, wherein one or more devices of the set of devices is provided with storage capability, which capability is accessible by at least one other device of the set.

15. A system according to claim 10, wherein each device of the set of devices has associated location information.

* * * * *